United States Patent
Noguchi

(10) Patent No.: US 9,635,266 B2
(45) Date of Patent: Apr. 25, 2017

(54) IMAGE STABILIZATION APPARATUS AND CONTROL METHOD THEREOF, AND STORAGE MEDIUM

(71) Applicant: CANON KABUSHIKI KAISHA, Tokyo (JP)

(72) Inventor: Masaaki Noguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 14/690,082

(22) Filed: Apr. 17, 2015

(65) Prior Publication Data
US 2015/0304564 A1    Oct. 22, 2015

(30) Foreign Application Priority Data
Apr. 21, 2014 (JP) ................. 2014-087589

(51) Int. Cl.
H04N 5/262 (2006.01)
H04N 5/232 (2006.01)

(52) U.S. Cl.
CPC ..... *H04N 5/23287* (2013.01); *H04N 5/23258* (2013.01); *H04N 5/23296* (2013.01)

(58) Field of Classification Search
None
See application file for complete search history.

(56) References Cited

U.S. PATENT DOCUMENTS

2011/0115929 A1 *   5/2011   Noguchi .................. G03B 5/00
                                                                348/208.4

FOREIGN PATENT DOCUMENTS

JP    2007-057981 A    3/2007

* cited by examiner

*Primary Examiner* — Stephen Coleman
(74) *Attorney, Agent, or Firm* — Cowan, Liebowitz & Latman, P.C.

(57) ABSTRACT

An image stabilization apparatus comprises an image stabilization unit configured to move a correction member based on a shake detected by a shake detection unit and stabilize an image blur based on the shake of the apparatus; a zoom unit configured to change a focal length of the imaging optical system; a calculation unit configured to calculate a movement amount of the correction member to reduce at least one of a variation in a light amount and a variation in a resolution; and a control unit configured to control, when changing the focal length, an actual movement amount to follow a target value of a movement position of the correction member by setting a limitation of a variation amount of the movement position per unit time on the movement amount calculated by the calculation unit.

9 Claims, 8 Drawing Sheets

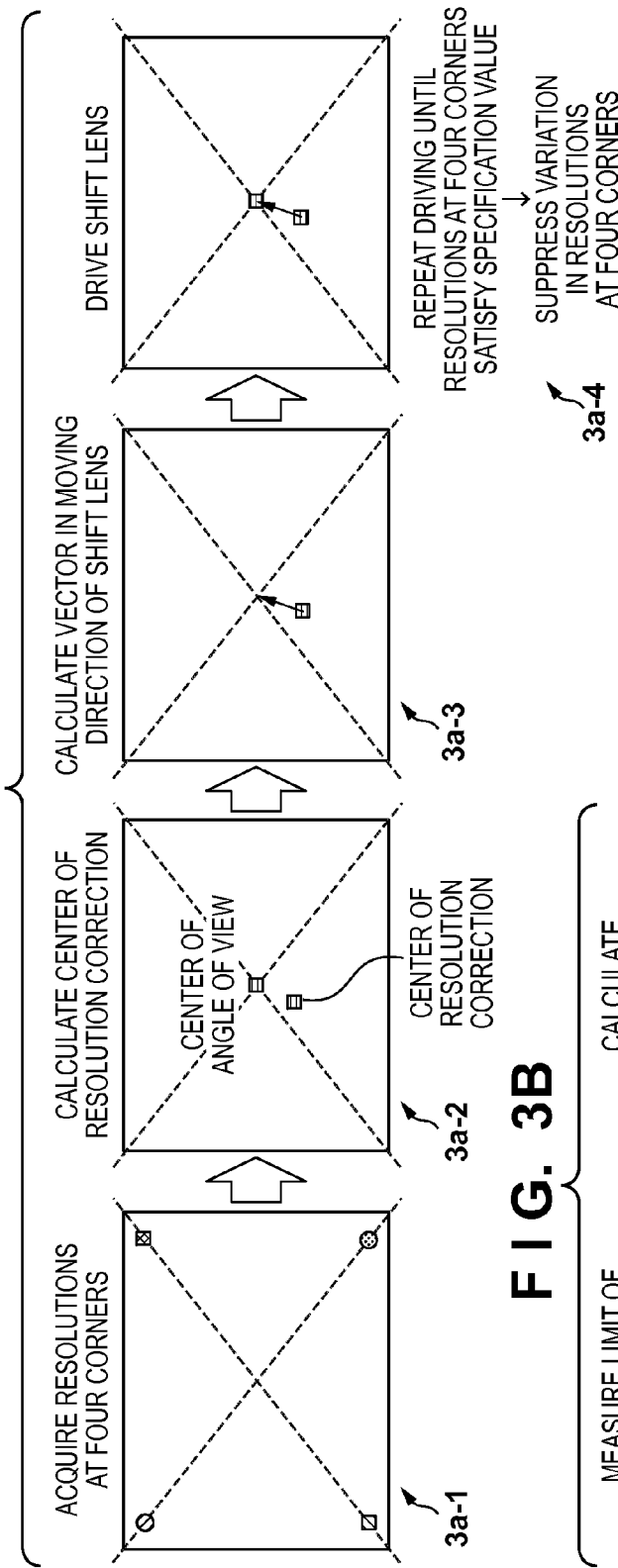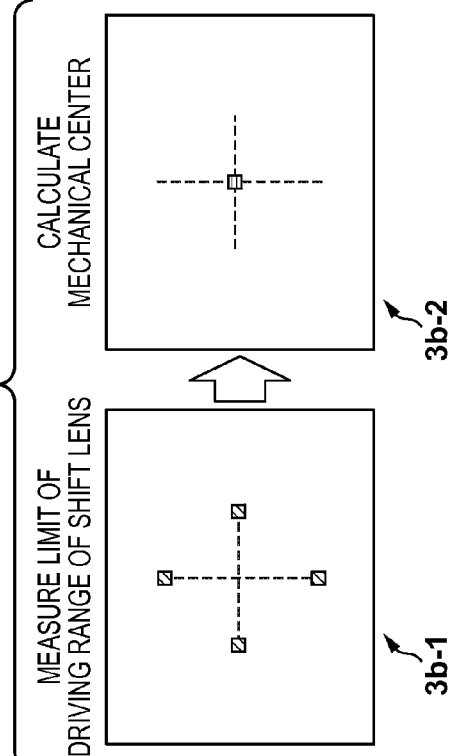

FIG. 4A
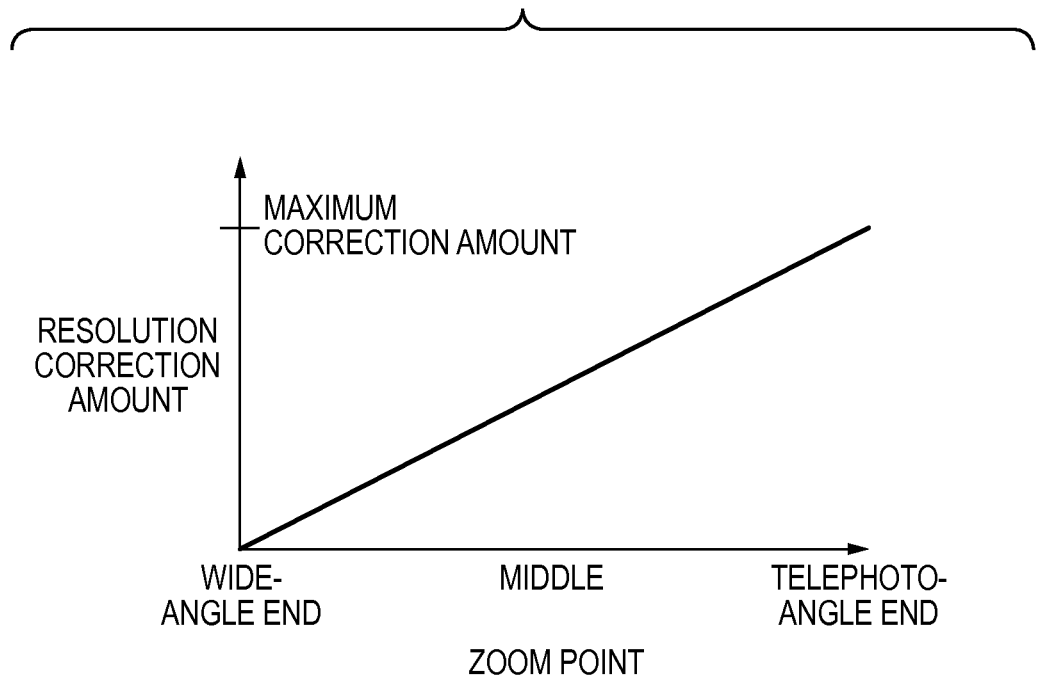
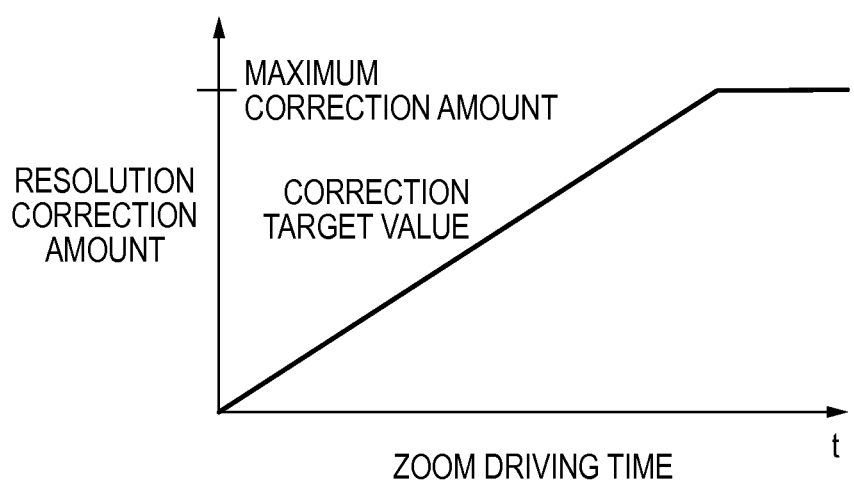

FIG. 4B
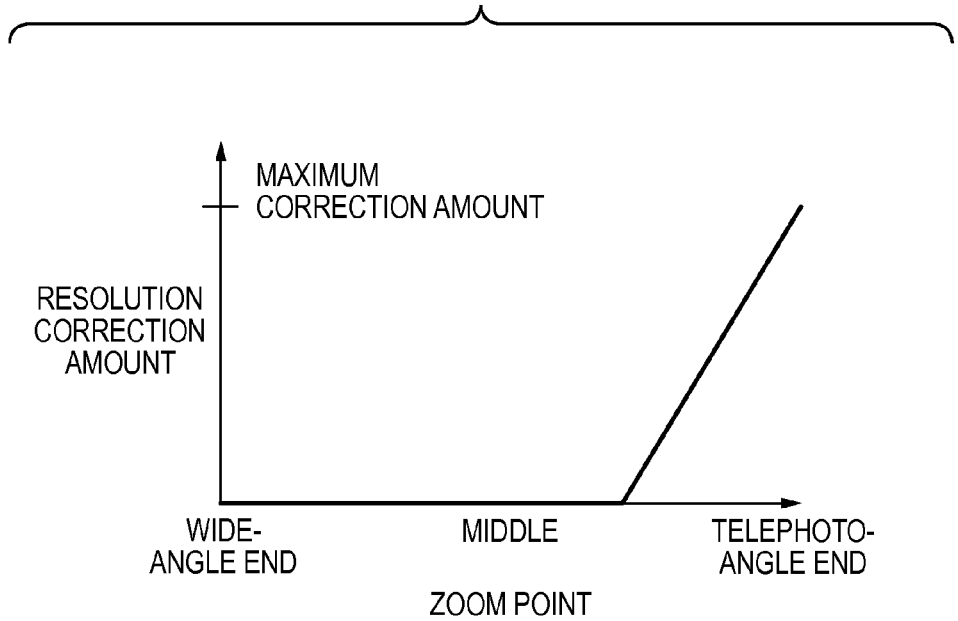
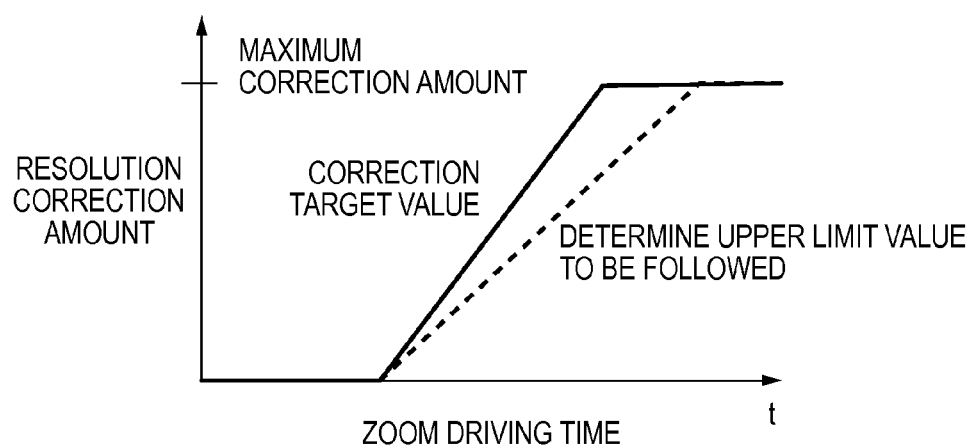

F I G. 4C
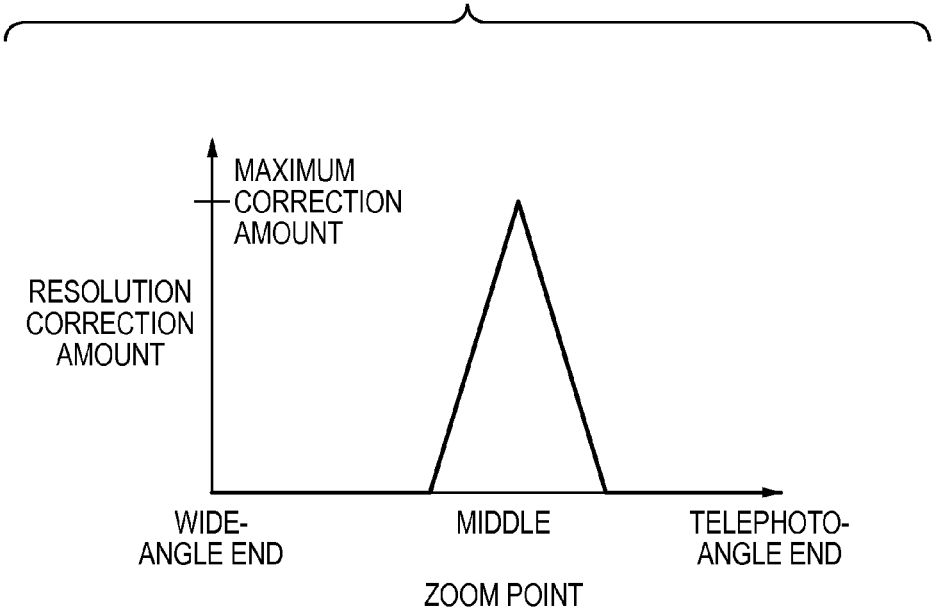
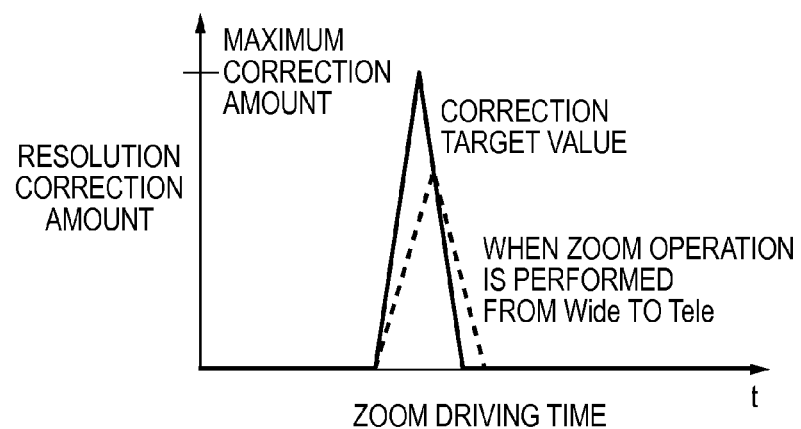

IMAGE STABILIZATION APPARATUS AND CONTROL METHOD THEREOF, AND STORAGE MEDIUM

BACKGROUND OF THE INVENTION

Field of the Invention

The present invention relates to a technique of correcting degradation in image quality in the peripheral region of a screen using a stabilization mechanism which stabilizes an image blur.

Description of the Related Art

There has conventionally been known an image capturing apparatus having an image stabilization function of detecting the shake of the image capturing apparatus and then driving an image stabilization lens to stabilize an image blur caused by this shake. An angular velocity sensor is generally used to detect the shake of an image stabilization apparatus. The angular velocity sensor vibrates a vibration material such as a piezoelectric element at a predetermined frequency and outputs a voltage corresponding to the Coriolis force generated by a rotational movement component as angular velocity information. The image stabilization apparatus obtains the amount and the direction of the shake by integrating the acquired angular velocity information and outputs a stabilization position control signal which drives the stabilization lens to cancel the image blur. When driving the stabilization lens, feedback control is performed in which the current position of the stabilization lens is fed back to the image stabilization apparatus as the position signal of the stabilization lens and the image stabilization apparatus outputs a stabilization position control signal corresponding to the position signal of the stabilization lens.

In general, image data obtained by the image capturing apparatus tends to become darker and have a lower resolution in the periphery including four corners than in the center. In particular, a phenomenon in which the light amount becomes smaller in the periphery than in the center is referred to as shading and a phenomenon in which the resolution becomes lower on one side than in the center is referred to as an one-sided blur, respectively. As the rate of decrease in the light amount, a variation in luminance, or a decrease in the resolution at the four corners is larger in the peripheral region than in the center, the quality of the image data deteriorates.

The degree of decrease in the light amount or the resolution is a characteristic that the lens originally has. Therefore, it can be said that the variation in luminance or the resolution at the four corners is caused by that characteristic. The degree of decrease in this light amount or resolution also varies in accordance with a focal length, that is, a zoom ratio. An example of the decrease in the resolution will be described below.

Each of FIGS. 6A and 6B is a graph of showing, as an example, a resolution with the abscissa plotting a distance from an optical center and the ordinate plotting the rate of the resolution (the resolution in the optical center is set to 1). As shown in FIG. 6A, the resolution on one side in the periphery of a lens decreases the most on the telephoto-side and hardly decreases on the wide angle side. Furthermore, as shown in FIG. 6B, when the resolution in the periphery decreases significantly, a variation in the resolution is increased by, for example, the mechanical error or play of a lens barrel which bundles respective lens groups.

A method of reducing a decrease in a light amount or the decrease in the resolution by using the arrangement of the image stabilization function is available. A case in which a shift lens is used as an image stabilization member in the image stabilization mechanism will be described here.

It is possible to keep a decrease in a light amount (or a resolution) at four corners within a predetermined level in the entire zoom range by adjusting the center position of a shift lens at a focal length where the decrease in the light amount (or the resolution) is the largest (Japanese Patent Laid-Open No. 2007-57981). Such adjustment of the center position of the shift lens will be referred to as "shading correction" (or "resolution correction") hereinafter. The center position adjusted by this shading correction (or this resolution correction) may differ from the center of a movable range where the shift lens can be moved mechanically.

With the conventional technique disclosed in Japanese Patent Laid-Open No. 2007-57981, however, when performing shading correction or resolution correction using the shift lens, a variation in the angle of view is noticeable at the time of a zoom operation if a correction amount varies greatly between zoom operations.

SUMMARY OF THE INVENTION

The present invention has been made in consideration of the above-described problems and makes a variation in the angle of view less noticeable when using an image stabilization mechanism for shading correction or resolution correction at the time of a zoom operation.

According to the first aspect of the present invention, there is provided an image stabilization apparatus comprising: an image stabilization unit configured to move a correction member which is movable in a direction different from an optical axis of an imaging optical system based on a shake detected by a shake detection unit and stabilize an image blur based on the shake of the apparatus; a zoom unit configured to change a focal length of the imaging optical system; a calculation unit configured to calculate a movement amount of the correction member corresponding to the focal length to reduce at least one of a variation in a light amount and a variation in a resolution in an imaging screen which varies in accordance with the focal length and is based on a characteristic of the imaging optical system; and a control unit configured to control, when changing the focal length by the zoom unit, an actual movement amount to follow a target value of a movement position of the correction member by setting a limitation of a variation amount of the movement position per unit time on the movement amount calculated by the calculation unit.

According to the second aspect of the present invention, there is provided a control method of an image stabilization apparatus including an image stabilization unit configured to move a correction member which is movable in a direction different from an optical axis of an imaging optical system based on a shake detected by a shake detection unit and stabilize an image blur based on the shake of the apparatus, and a zoom unit configured to change a focal length of the imaging optical system, the method comprising: a calculation step of calculating a movement amount of the correction member corresponding to the focal length to reduce at least one of a variation in a light amount and a variation in a resolution in an imaging screen which varies in accordance with the focal length and is based on a characteristic of the imaging optical system; and a control step of controlling, when changing the focal length by the zoom unit, an actual movement amount to follow a target value of a movement position of the correction member by setting a limitation of a variation amount of the movement position per unit time on the movement amount calculated in the calculation step.

Further features of the present invention will become apparent from the following description of exemplary embodiments with reference to the attached drawings.

BRIEF DESCRIPTION OF THE DRAWINGS

FIGS. 3A and 3B are explanatory views of shading correction or resolution correction according to an embodiment;

FIGS. 4A to 4C are graphs showing a focal length and a resolution correction amount according to an embodiment;

DESCRIPTION OF THE EMBODIMENTS

An embodiment of the present invention will be described below in detail with reference the accompanying drawings.

Figure 1:
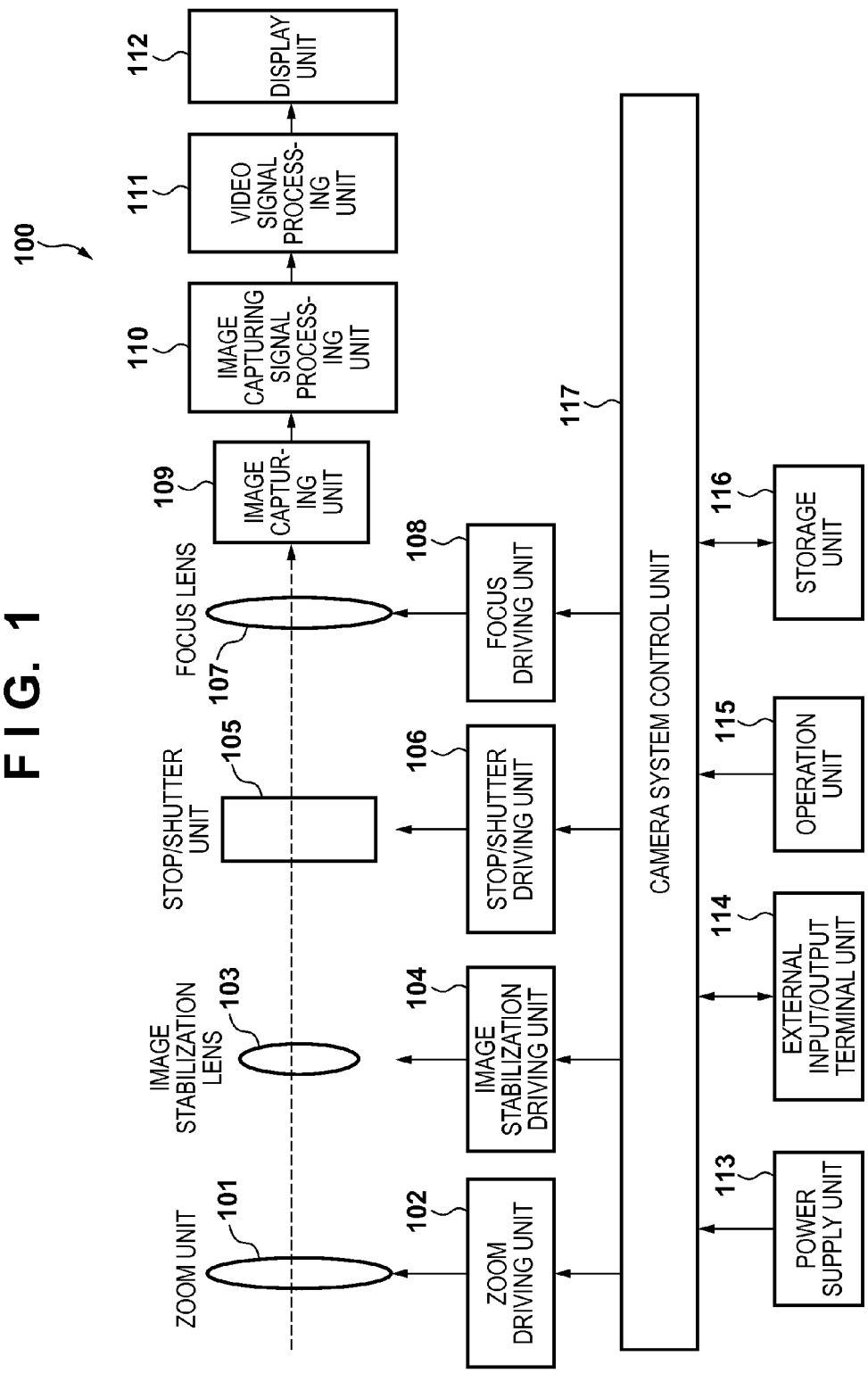
FIG. 1 is a block diagram showing an image capturing apparatus according to an embodiment of the present invention.

FIG. 1 is a block diagram showing the arrangement of an image capturing apparatus according to an embodiment of the present invention. In this embodiment, an image capturing apparatus 100 is a digital still camera, which may have a moving image shooting function.

A zoom unit 101 is part of a photographing lens which forms an imaging optical system. The zoom unit 101 includes a zoom lens for changing the lens magnification. A zoom driving unit 102 controls driving of the zoom unit 101 under the control of a camera system control unit 117. An image stabilization lens (to be also referred to as a shift lens hereinafter) 103 serving as an image stabilization member is movable in a direction perpendicular to the optical axis of the photographing lens. An image stabilization driving unit 104 controls driving of the image stabilization lens 103.

A stop/shutter unit 105 is a mechanical shutter having the stop function. A stop/shutter driving unit 106 drives the stop/shutter unit 105 under the control of the camera system control unit 117. A focus lens 107 is part of the photographing lens, and can change its position along the optical axis of the photographing lens. A focus driving unit 108 drives the focus lens 107 under the control of the camera system control unit 117.

An image capturing unit 109 converts an optical image formed via the photographing lens into an electrical signal of each pixel using an image sensor such as a CCD image sensor or a CMOS image sensor. An image capturing signal processing unit 110 performs A/D conversion, correlated double sampling, gamma correction, white balance correction, color interpolation processing, and the like for the electrical signal output from the image capturing unit 109, and converts the electrical signal into a video signal. A video signal processing unit 111 processes the video signal output from the image capturing signal processing unit 110 in accordance with an application purpose. More specifically, the video signal processing unit 111 generates a display video, and performs encoding processing and data file processing for recording.

A display unit 112 displays an image based on the display video signal output from the video signal processing unit 111, as needed. A power supply unit 113 supplies power to the entire image capturing apparatus 100 in accordance with an application purpose. An external input/output terminal unit 114 inputs/outputs communication signals and video signals from/to an external apparatus. An operation unit 115 includes buttons and switches used by the user to input instructions to the image capturing apparatus 100. A storage unit 116 stores various data such as video information. The camera system control unit 117 includes, for example, a CPU, a ROM, and a RAM. The camera system control unit 117 controls the respective units of the image capturing apparatus by expanding, in the RAM, a control program stored in the ROM and executing it by the CPU, thereby implementing operations of the image capturing apparatus 100 including various operations to be described below.

The operation unit 115 includes a release button configured to sequentially turn on a first switch (SW1) and a second switch (SW2) in accordance with press amounts. The release switch SW1 is turned on when the release button is pressed about halfway, and the release switch SW2 is turned on when it is pressed fully. When the release switch SW1 is turned on, the camera system control unit 117 performs, for example, auto focus adjustment by controlling the focus driving unit 108 based on an AF evaluation value based on a display video signal output from the video signal processing unit 111 to the display unit 112. Furthermore, the camera system control unit 117 performs AE processing to decide an f-number and shutter speed for obtaining an appropriate exposure amount based on luminance information of the video signal and, for example, a predetermined program chart. When the release switch SW2 is turned on, the camera system control unit 117 controls the respective units to perform shooting at the determined f-number and shutter speed and store image data obtained by the image capturing unit 109 in the storage unit 116. Furthermore, when displaying a live view image in a state in which the release switches are not pressed, the camera system control unit 117 includes the f-number and the shutter speed in still image shooting exposure at a predetermined interval based on the luminance information of the video signal and the program chart described above, and makes a preliminary determination.

The operation unit 115 includes a image stabilization switch capable of selecting an image stabilization mode. When the user selects the image stabilization mode with the image stabilization switch, the camera system control unit 117 instructs the image stabilization driving unit 104 to perform an image stabilization operation. Upon receiving the instruction, the image stabilization driving unit 104 executes the image stabilization operation until it is instructed to turn off image stabilization. The operation unit 115 also includes a shooting mode selection switch capable of selecting either a still image shooting mode or a moving image shooting mode. In each shooting mode, the operation condition of the image stabilization driving unit 104 can be changed.

The operation unit 115 also includes a playback mode selection switch for selecting the playback mode. In the playback mode, the image stabilization operation is stopped. Further, the operation unit 115 includes a zoom switch used to input a zooming instruction. When the zooming instruction is input from the zoom switch, the zoom driving unit 102 receives the instruction via the camera system control unit 117, and drives the zoom unit 101 to move the zoom unit 101 to the instructed zoom position.

Figure 2:
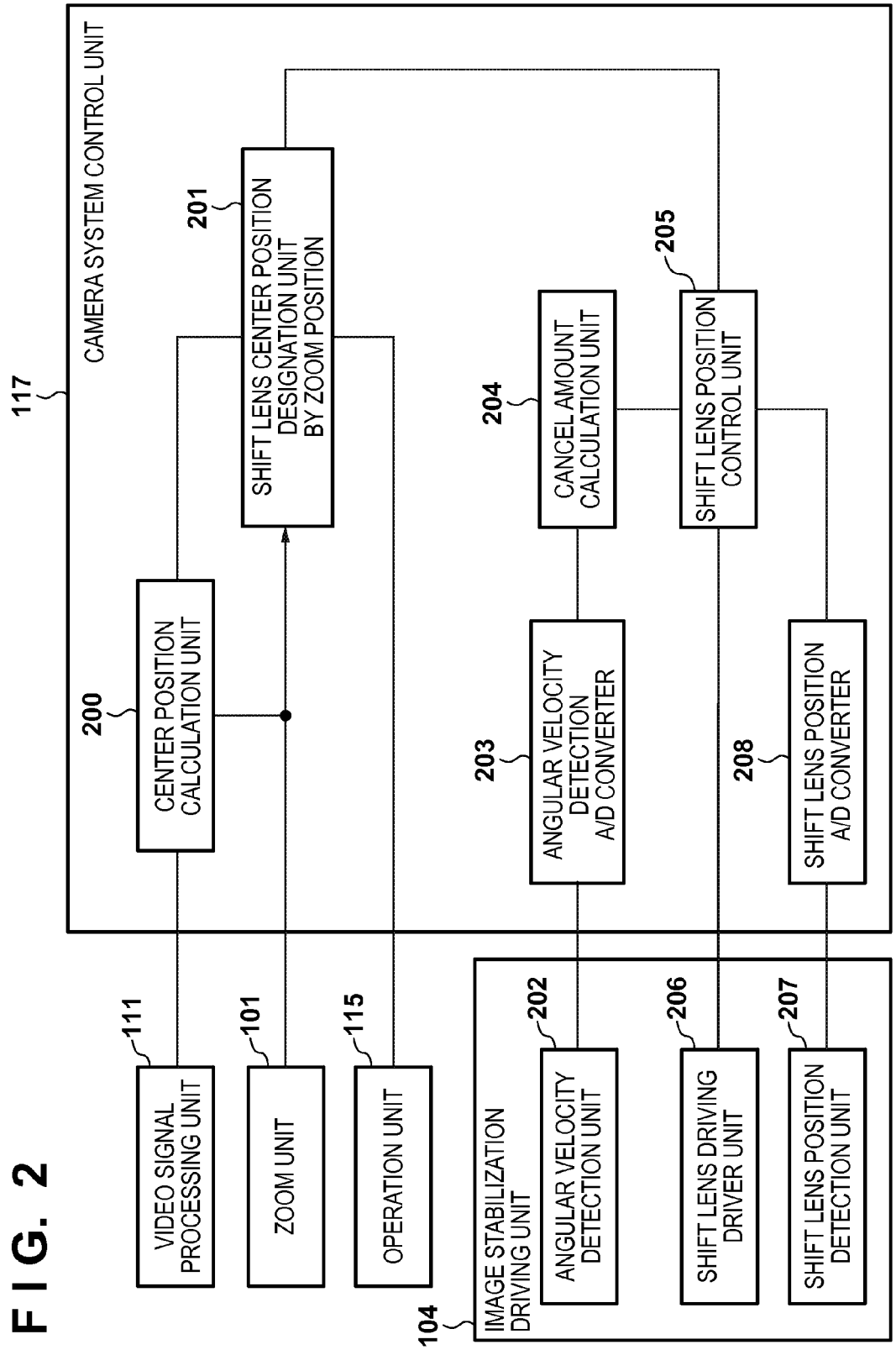
FIG. 2 is a block diagram showing the detailed arrangements of a camera system control unit and an image stabilization control unit.

FIG. 2 is a block diagram for explaining in more detail the relationship between the image stabilization driving unit 104 and the camera system control unit 117. They have the same arrangement in both the pitch and yaw directions, so an arrangement for only one axis will be explained.

An angular velocity detection unit (gyro) 202 detects an angular velocity and outputs the detected velocity as a voltage. An angular velocity detection A/D converter 203 converts a voltage signal output by the angular velocity detection unit 202 into digital angular velocity data. A cancel amount calculation unit (driving amount calculation unit) 204 integrates the angular velocity data to generate angular data, sets data in the opposite direction of this angular data to data which cancels an image blur, and changes a characteristic in accordance with the driving range of the image stabilization lens 103, thereby calculating a blur cancel amount (driving amount). A shift lens position control unit 205 is notified of the blur cancel amount (driving amount) calculated by the cancel amount calculation unit 204. A shift lens center position designation unit 201 notifies the shift lens position control unit 205 of a change in the center position according to the focal length.

A shift lens position detection unit 207 detects the position of the image stabilization lens 103 and outputs the detected position as a voltage. A shift lens position A/D converter 208 converts data output by the shift lens position detection unit 207 into digital data.

The shift lens position control unit 205 obtains the difference between position data detected by the shift lens position A/D converter 208 and the blur cancel amount, and performs feedback control so that the deviation thereof approaches 0. Finally, a shift lens drive driver unit 206 is notified of a driving signal (shift amount) which has an offset corresponding to the center position of the image stabilization lens 103 changed in accordance with the focal length notified from the shift lens center position designation unit 201 and drives the image stabilization lens 103. Upon notified of the driving signal, the shift lens drive driver unit 206 drives the image stabilization lens 103 by an amount corresponding to that driving signal.

A center position calculation unit 200 calculates a movement destination position of the center (to be referred to as a "center position" hereinafter) of the image stabilization lens 103 with respect to the image capturing unit 109. A predetermined position may be determined in advance as this center position, a center position to fall within a predetermined range in which a peripheral resolution in an imaging screen varies may be calculated, or a center position may be obtained by equally dividing the movable range of the image stabilization lens 103 within a predetermined error range. Note that either the center position to fall within the predetermined range in which the peripheral resolution varies or the center position obtained by equally dividing the predetermined error range is used in the description below. Furthermore, each of these values is obtained in correspondence with a zoom ratio determined in advance at the time of factory delivery, stored in, for example, a memory (not shown) in the center position calculation unit 200, and read out when activating the image capturing apparatus.

A method of acquiring the center of resolution correction will be described with reference to FIG. 3A. First, peripheral resolutions at the four corners are acquired from image data output from the video signal processing unit 111 (3a-1). If the acquired resolutions at the four corners vary in the image data, the movement destination position of the center (center position) of the image stabilization lens 103 where the variation is reduced as compared with the center of the angle of view is obtained (3a-2). Then, the control value of the image stabilization lens 103 to cause the image stabilization lens 103 to come at the obtained center position is obtained (3a-3) and the image stabilization lens 103 is moved based on the obtained control value (3a-4). These processes of (3a-1) to (3a-4) are repeated until the variation in the peripheral resolutions falls within a predetermined range. The center position of the image stabilization lens 103 obtained as a result of these processes will be referred to as a "center of resolution correction" hereinafter.

A method of acquiring a mechanical center will now be described with reference to FIG. 3B. First, the image stabilization lens 103 is driven to the limits in the horizontal and vertical directions on a mechanical driving range surface (3b-1). The center point of respective limit points in the driving range at this time is defined as the mechanical center (3b-2). The center position of the image stabilization lens 103 obtained as a result of these processes will be referred to as a "mechanical center" hereinafter.

The shift lens center position designation unit 201 notifies the shift lens position control unit 205 of the center position shift amount of the image stabilization lens 103 under driving control of the zoom lens based on the center position obtained by the center position calculation unit 200. Note that the center position calculation unit 200 and the shift lens center position designation unit 201 form a shift position calculation unit. A way in which the center position is shifted by the shift lens center position designation unit 201 in accordance with the focal length will be described.

A case in which the decrease in the resolution is larger at the telephoto-angle end than at the wide-angle end will be described as an example. In this case, the center position of the image stabilization lens 103 is the center of resolution correction at the telephoto-angle end and the mechanical center at the wide-angle end. At the middle point between the telephoto-angle end and the wide-angle end, the center position of the image stabilization lens 103 is a position obtained by linear interpolation, focal length interpolation, or the combination of linear interpolation and focal length interpolation of the center position between the two points of the telephoto-angle end and the wide-angle end.

On the contrary, if the decrease in the resolution is larger at the wide-angle end than at the telephoto-angle end, the center position of the image stabilization lens 103 is the mechanical center at the telephoto-angle end and the center of resolution correction at the wide-angle end. At the middle point between the telephoto-angle end and the wide-angle end, interpolation such as linear interpolation, focal length interpolation, or the like of the center position between the two points of the telephoto-angle end and the wide-angle end is performed. This makes it possible to smooth the appearance of a live image while minimizing a shift in the angle of view caused by a zoom lens position.

The variation amount of resolution correction and an influence on an appearance condition by resolution correction at the time of zoom driving will now be described. Each of FIGS. 4A and 4C shows a zoom point (focal length) and a zoom driving time, and a variation in a resolution correction amount.

When the correction amount varies at all zoom positions from the wide-angle end to the telephoto-angle end as shown in FIG. 4A, the resolution correction amount per unit time at the time of zoom driving is not so large and even if the shift lens is moved off the mechanical center for resolution correction at the time of a zoom operation, it is not so noticeable. However, when resolution correction is not performed on the wide angle side but only performed from a predetermined middle position to the telephoto-angle end as shown in FIG. 4B, the resolution correction amount per unit time at the time of zoom driving becomes large if the same amount of resolution correction is needed. For this reason, a variation in the angle of view caused by the movement of the shift lens becomes noticeable even if the angle of view varies in response to a variation in the focal length during the zoom operation.

In addition, when resolution correction is not performed on the wide angle side and the telephoto-side but only performed in a middle region as shown in FIG. 4C, a variation in the resolution correction amount also becomes large. In this case, a behavior of the angle of view which reciprocally moves in the vertical direction or the horizontal direction abruptly when zoom driving is performed at once from the wide-angle end to the telephoto-angle end is exhibited. Particularly, when resolution correction is performed in recording a moving image, it is not preferable to record an abrupt variation in the angle of view by the zoom operation.

In order to prevent such an abrupt variation in the angle of view as a result of correction, this embodiment performs a method of causing an actual correction amount to follow a proper correction target value by setting a limitation on the correction amount per unit time in the shift lens center position designation unit 201 by the zoom position.

For example, when zoom driving is performed from the middle position to the telephoto-angle end as shown in FIG. 4B, assume that resolution correction is performed by driving the shift lens by 50 µm at the telephoto-angle end. At this time, zoom driving from the middle position to the telephoto-angle end takes 1 sec. If the resolution correction amount is updated every 20 ms, an average correction amount is 1 µm at a time. Furthermore, if the resolution correction amount is varied by focal length correction, the correction variation amount can become larger in proximity to the zoom point where the variation in the focal length is large. By setting an upper limit on the correction variation amount and the limitation on the correction amount per unit time in such a case where the correction value variation amount is larger than a predetermined value when the correction amount is updated every 20 ms, it is possible to prevent the abrupt variation in the angle of view. In this case, correction has not been completed by a target amount of correction (to be referred to as a correction target value hereinafter) by setting the upper limit. It is possible, however, to perform correction to follow the correction target value by continuing correction by a correction remaining amount. It is desirable to set, as the upper limit value of the correction amount, a value which reduces the abrupt variation in the angle of view at the time of zoom driving to make it less noticeable and also makes a delay less noticeable when following the correction target value.

Furthermore, in a case of correction as shown in FIG. 4C, when the zoom operation is performed at once from the wide-angle end to the telephoto-angle end, the correction target value is followed with a delay, and thus a shape indicated by a dotted line in the lower graph of FIG. 4C is obtained. Therefore, the method according to this embodiment can suppress the variation amount of the angle of view and also improve the appearance condition.

Figure 5:
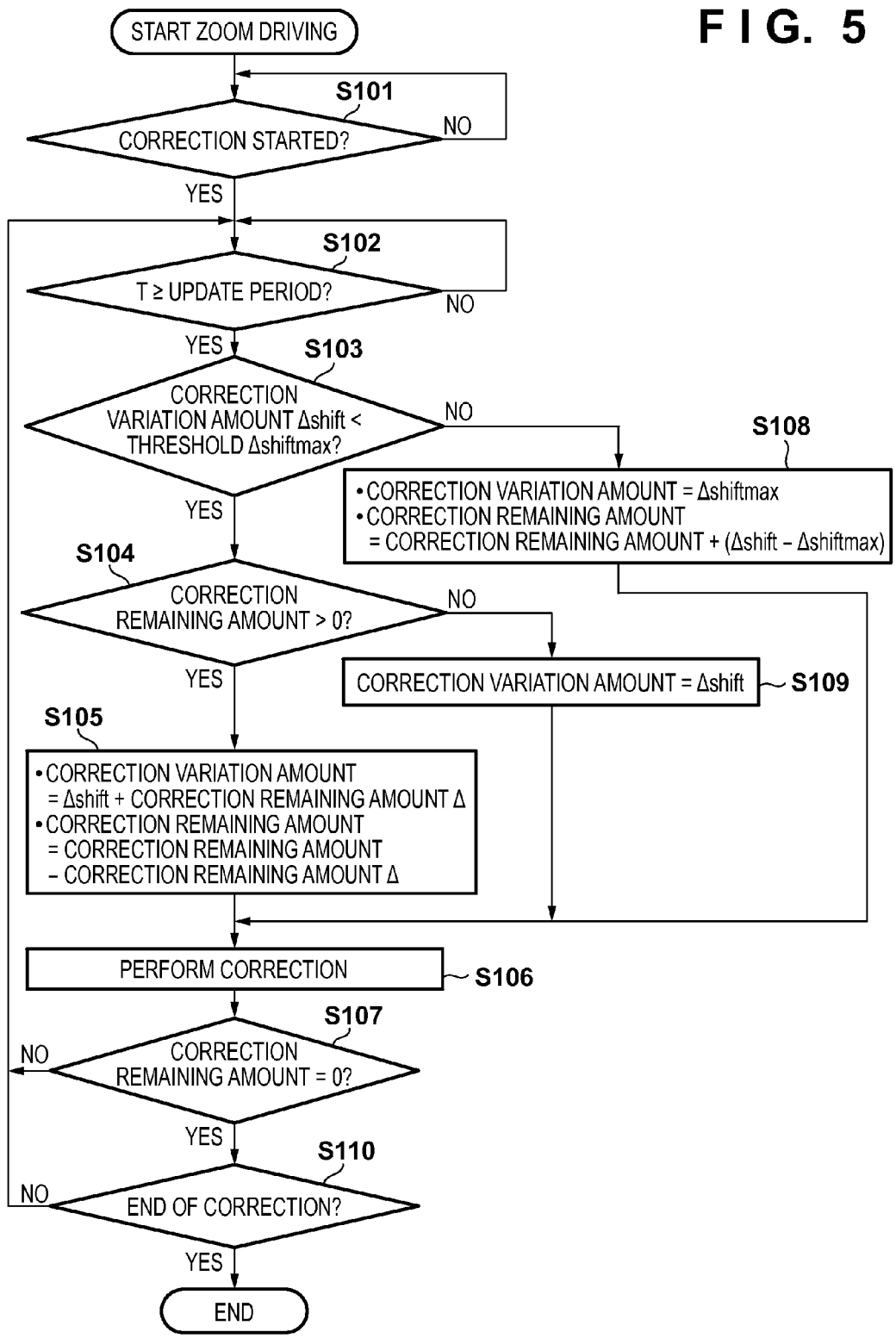
FIG. 5 is a flowchart showing correction processing according to an embodiment.
Figure 6A:
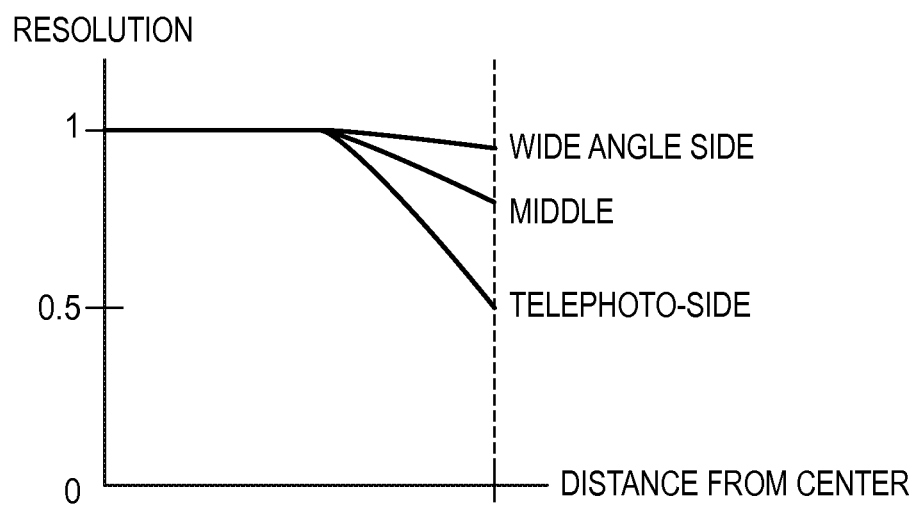
FIGS. 6A and 6B are graphs showing an example of a decrease in a peripheral resolution in accordance with the focal length.
Figure 6B:
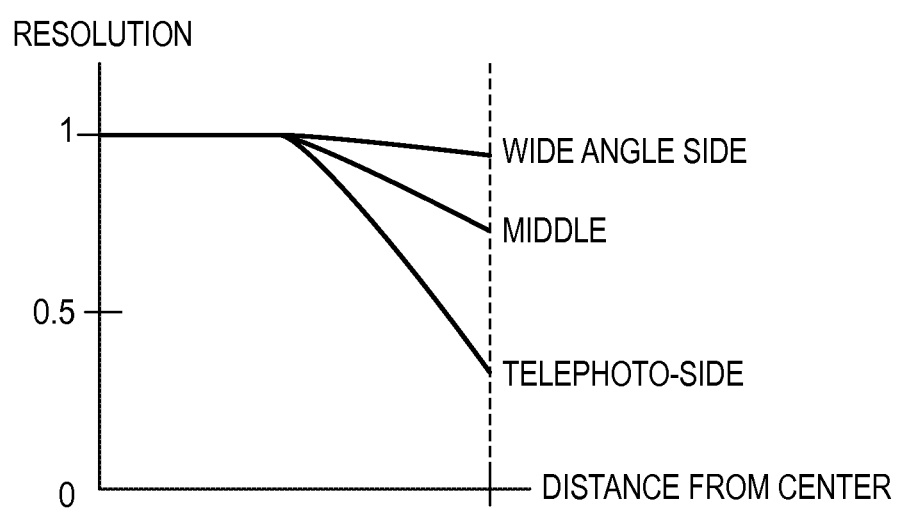

FIG. 5 is a flowchart showing correction processing. After zoom driving starts, it is determined in step S101 whether it is the zoom position to start correction. If it is the zoom position targeted for correction, correction is started. After the correction is started, it is determined whether a time corresponding to an update period (20 ms, here) has elapsed (step S102). If the update period of time has been elapsed, the process advances to step S103.

In step S103, a correction variation amount (Δshift) is first obtained from a current correction amount with respect to the correction target amount. Then, it is determined whether the correction variation amount (Δshift) is smaller than a correction upper limit threshold (Δshiftmax). If the correction variation amount (Δshift) is smaller than the correction upper limit threshold (Δshiftmax), the process advances to step S104. It is determined in step S104 whether the correction remaining amount by which has not been completed with respect to the correction target value is larger than 0. If there is the correction remaining amount, the process advances to step S105.

In step S105, a new correction variation amount is set by adding the correction remaining amount to the correction variation amount (Δshift). The maximum value of the correction variation amount at this time is set as the correction upper limit threshold (Δshiftmax). When the remainder of correction is added, the added amount is subtracted from the correction remaining amount and correction for the remaining amount will be performed in the next and subsequent correction. In step S106, correction is performed from the current position by the correction variation amount determined in step S105. If the correction remaining amount is 0 in step S104, correction is performed assuming that the correction variation amount is Δshift.

On the other hand, if the correction variation amount (Δshift) is larger than the correction upper limit threshold (Δshiftmax) in step S103, correction is performed by assuming that the correction variation amount is Δshiftmax and adding an amount incapable of correction to the correction remaining amount (step S108).

It is determined in step S107 whether the correction remaining amount is 0. If there is the remainder of correction, the process returns to step S102 and the correction processing continues. This correction remaining amount becomes a delay time of correction. It is therefore preferable to set an optimal correction upper limit threshold so as not to be an excessively large.

If the correction remaining amount becomes 0 in step S107, the process advances to step S110 to determine whether it is the zoom position to end correction. If it is the zoom position to end correction, the process ends. If it is not the zoom position to end correction, the process returns to step S102 and the correction processing continues (If the correction remaining amount is 0, a standby state is set as a correction variation amount Δ=0).

By setting the upper limit value for the correction variation amount per unit time as in the flowchart above, it is possible to reduce the shift in the angle of view by abrupt correction. The upper limit is set on the correction variation amount per unit time in the above-described embodiment. However, the upper limit may be set on the correction variation amount depending on, as another example, a zoom speed (the driving speed of zoom). If the zoom speed is high, the upper limit value is increased because the shift in the angle of view by correction is not noticeable by the variation in the angle of view in response to the variation in the focal length. On the other hand, if the zoom speed is low, the upper limit value is decreased.

Furthermore, from a similar point of view, the upper limit value of the correction variation amount may be set in accordance with the variation amount of the focal length at the time of zoom driving. If the variation in the focal length is large, the upper limit value is increased. On the other hand, if the variation in the focal length is small, the upper limit value is decreased. This also applies to the amount of the variation in the angle of view in response to the variation in the focal length at the time of zoom driving.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-087589, filed Apr. 21, 2014, which is hereby incorporated by reference herein in its entirety.

What is claimed is:

1. An image stabilization apparatus comprising:
at least one processor or circuit to perform the operations of the following units:
an image stabilization unit to move a correction member which is movable in a direction different from an optical axis of an imaging optical system based on a shake detected by a shake detection unit and stabilize an image blur based on the shake of the apparatus;
a zoom unit to change a focal length of the imaging optical system;
a calculation unit to calculate a movement amount of the correction member corresponding to the focal length to reduce at least one of a variation in a light amount and a variation in a resolution in an imaging screen which varies in accordance with the focal length and is based on a characteristic of the imaging optical system; and
a control unit to control, when changing the focal length by the zoom unit, an actual movement amount to follow a target value of a movement position of the correction member by setting a limitation of a variation amount of the movement position per unit time on the movement amount calculated by the calculation unit,
wherein the control unit sets an upper limit value of the limitation of the variation amount of the movement position larger than a first threshold value when a driving speed of the zoom unit when changing the focal length is higher than a second threshold value and sets the upper limit value of the limitation of the variation amount of the movement position smaller than the first threshold value when the driving speed of the zoom unit is lower than the second threshold value.

2. An image stabilization apparatus comprising:
at least one processor or circuit to perform the operations of the following units:
an image stabilization unit to move a correction member which is movable in a direction different from an optical axis of an imaging optical system based on a shake detected by a shake detection unit and stabilize an image blur based on the shake of the apparatus;
a zoom unit to change a focal length of the imaging optical system;
a calculation unit to calculate a movement amount of the correction member corresponding to the focal length to reduce at least one of a variation in a light amount and a variation in a resolution in an imaging screen which varies in accordance with the focal length and is based on a characteristic of the imaging optical system; and
a control unit to control, when changing the focal length by the zoom unit, an actual movement amount to follow a target value of a movement position of the correction member by setting a limitation of a variation amount of the movement position per unit time on the movement amount calculated by the calculation unit,
wherein the control unit sets an upper limit value of the limitation of the variation amount of the movement position larger than a third threshold value when a variation amount of the focal length when changing the focal length is larger than a fourth threshold value and sets the upper limit value of the limitation of the variation amount of the movement position smaller than the third threshold value when the variation amount of the focal length is smaller than the fourth threshold value.

3. An image stabilization apparatus comprising:
at least one processor or circuit to perform the operations of the following units:
an image stabilization unit to move a correction member which is movable in a direction different from an optical axis of an imaging optical system based on a shake detected by a shake detection unit and stabilize an image blur based on the shake of the apparatus;
a zoom unit to change a focal length of the imaging optical system;
a calculation unit to calculate a movement amount of the correction member corresponding to the focal length to reduce at least one of a variation in a light amount and a variation in a resolution in an imaging screen which varies in accordance with the focal length and is based on a characteristic of the imaging optical system; and
a control unit to control, when changing the focal length by the zoom unit, an actual movement amount to follow a target value of a movement position of the correction member by setting a limitation of a variation amount of the movement position per unit time on the movement amount calculated by the calculation unit,
wherein the control unit sets an upper limit value of the limitation of the variation amount of the movement position larger than a fifth threshold value when a variation amount of an angle of view when changing the focal length is larger than a sixth threshold value and sets the upper limit value of the limitation of the variation amount of the movement position smaller than the fifth threshold value when the variation amount of the angle of view is smaller than sixth threshold value.

4. A control method of an image stabilization apparatus including an image stabilization unit to move a correction member which is movable in a direction different from an optical axis of an imaging optical system based on a shake detected by a shake detection unit and stabilize an image blur based on the shake of the apparatus, and a zoom unit to change a focal length of the imaging optical system, the method comprising:

calculating a movement amount of the correction member corresponding to the focal length to reduce at least one of a variation in a light amount and a variation in a resolution in an imaging screen which varies in accordance with the focal length and is based on a characteristic of the imaging optical system; and controlling, when changing the focal length by the zoom unit, an actual movement amount to follow a target value of a movement position of the correction member by setting a limitation of a variation amount of the movement position per unit time on the movement amount calculated in the calculating, wherein an upper limit value of the limitation of the variation amount of the movement position is set larger than a first threshold value when a driving speed of the zoom unit when changing the focal length is higher than a second threshold value and the upper limit value of the limitation of the variation amount of the movement position is set smaller than the first threshold value when the driving speed of the zoom unit is lower than the second threshold value.

5. A control method of an image stabilization apparatus including an image stabilization unit to move a correction member which is movable in a direction different from an optical axis of an imaging optical system based on a shake detected by a shake detection unit and stabilize an image blur based on the shake of the apparatus, and a zoom unit to change a focal length of the imaging optical system, the method comprising:

calculating a movement amount of the correction member corresponding to the focal length to reduce at least one of a variation in a light amount and a variation in a resolution in an imaging screen which varies in accordance with the focal length and is based on a characteristic of the imaging optical system; and controlling, when changing the focal length by the zoom unit, an actual movement amount to follow a target value of a movement position of the correction member by setting a limitation of a variation amount of the movement position per unit time on the movement amount calculated in the calculating, wherein an upper limit value of the limitation of the variation amount of the movement position is set larger than a third threshold value when a variation amount of the focal length when changing the focal length is larger than a fourth threshold value and the upper limit value of the limitation of the variation amount of the movement position is set smaller than the third threshold value when the variation amount of the focal length is smaller than the fourth threshold value.

6. A control method of an image stabilization apparatus including an image stabilization unit to move a correction member which is movable in a direction different from an optical axis of an imaging optical system based on a shake detected by a shake detection unit and stabilize an image blur based on the shake of the apparatus, and a zoom unit to change a focal length of the imaging optical system, the method comprising:

calculating a movement amount of the correction member corresponding to the focal length to reduce at least one of a variation in a light amount and a variation in a resolution in an imaging screen which varies in accordance with the focal length and is based on a characteristic of the imaging optical system; and controlling, when changing the focal length by the zoom unit, an actual movement amount to follow a target value of a movement position of the correction member by setting a limitation of a variation amount of the movement position per unit time on the movement amount calculated in the calculating, wherein an upper limit value of the limitation of the variation amount of the movement position is set larger than a fifth threshold value when a variation amount of an angle of view when changing the focal length is larger than a sixth threshold value and the upper limit value of the limitation of the variation amount of the movement position is set smaller than the fifth threshold value when the variation amount of the angle of view is smaller than the sixth threshold value.

7. A non-transitory computer readable storage medium storing a program for causing a computer to execute a control method of an image stabilization apparatus including an image stabilization unit to move a correction member which is movable in a direction different from an optical axis of an imaging optical system based on a shake detected by a shake detection unit and stabilize an image blur based on the shake of the apparatus, and a zoom unit to change a focal length of the imaging optical system, the method comprising:

calculating a movement amount of the correction member corresponding to the focal length to reduce at least one of a variation in a light amount and a variation in a resolution in an imaging screen which varies in accordance with the focal length and is based on a characteristic of the imaging optical system; and controlling, when changing the focal length by the zoom unit, an actual movement amount to follow a target value of a movement position of the correction member by setting a limitation of a variation amount of the movement position per unit time on the movement amount calculated in the calculating, wherein an upper limit value of the limitation of the variation amount of the movement position is set larger than a first threshold value when a driving speed of the zoom unit when changing the focal length is higher than a second threshold value and the upper limit value of the limitation of the variation amount of the movement position is set smaller than the first threshold value when the driving speed of the zoom unit is lower than the second threshold value.

8. A non-transitory computer readable storage medium storing a program for causing a computer to execute a control method of an image stabilization apparatus including an image stabilization unit to move a correction member which is movable in a direction different from an optical axis of an imaging optical system based on a shake detected by a shake detection unit and stabilize an image blur based on the shake of the apparatus, and a zoom unit to change a focal length of the imaging optical system, the method comprising:

calculating a movement amount of the correction member corresponding to the focal length to reduce at least one of a variation in a light amount and a variation in a resolution in an imaging screen which varies in accordance with the focal length and is based on a characteristic of the imaging optical system; and controlling, when changing the focal length by the zoom unit, an actual movement amount to follow a target value of a movement position of the correction member by setting a limitation of a variation amount of the movement position per unit time on the movement amount calculated in the calculating, wherein an upper limit value of the limitation of the variation amount of the movement position is set larger than a third threshold value when a variation amount of the focal length when changing the focal length is larger than a fourth threshold value and the upper limit value of the limitation of the variation amount of the movement position is set smaller than the third threshold value when the variation amount of the focal length is smaller than the fourth threshold value.

9. A non-transitory computer readable storage medium storing a program for causing a computer to execute a control method of an image stabilization apparatus including an image stabilization unit to move a correction member which is movable in a direction different from an optical axis of an imaging optical system based on a shake detected by a shake detection unit and stabilize an image blur based on the shake of the apparatus, and a zoom unit to change a focal length of the imaging optical system, the method comprising:

calculating a movement amount of the correction member corresponding to the focal length to reduce at least one of a variation in a light amount and a variation in a resolution in an imaging screen which varies in accordance with the focal length and is based on a characteristic of the imaging optical system; and controlling, when changing the focal length by the zoom unit, an actual movement amount to follow a target value of a movement position of the correction member by setting a limitation of a variation amount of the movement position per unit time on the movement amount calculated in the calculating, wherein an upper limit value of the limitation of the variation amount of the movement position is set larger than a fifth threshold value when a variation amount of an angle of view when changing the focal length is larger than a sixth threshold value and the upper limit value of the limitation of the variation amount of the movement position is set smaller than the fifth threshold value when the variation amount of the angle of view is smaller than the sixth threshold value.

* * * * *